United States Patent [19]

Ford

[11] Patent Number: 5,570,534
[45] Date of Patent: Nov. 5, 1996

[54] FISHING ROD JIGGER AND AUTOMATIC HOOK SETTING DEVICE

[75] Inventor: Wayne M. Ford, Newaygo, Mich.

[73] Assignees: Michael R. Bowen; David N. Bowen, both of Grand Rapids, Mich.; a part interest to each

[21] Appl. No.: 468,251

[22] Filed: Jun. 6, 1995

[51] Int. Cl.$^6$ ................................................. A01K 87/00
[52] U.S. Cl. .................... 43/19.2; 43/15; 43/16; 43/26.1
[58] Field of Search .................... 43/15, 16, 17, 43/19.2, 26.1

[56] References Cited

U.S. PATENT DOCUMENTS

| | | |
|---|---|---|
| 2,783,575 | 3/1957 | Housel, Sr. . |
| 3,550,302 | 12/1970 | Creviston et al. . |
| 3,568,352 | 3/1971 | Hill . |
| 3,739,514 | 6/1973 | Odney . |
| 4,197,668 | 4/1980 | McKinsey . |
| 4,251,939 | 2/1981 | Tiede ............................ 43/19.2 |
| 4,373,287 | 2/1983 | Grahl . |
| 4,550,519 | 11/1985 | Simmons et al. ............. 43/15 |
| 4,627,186 | 12/1986 | Wang . |
| 4,642,930 | 2/1987 | Graf . |
| 4,704,816 | 11/1987 | Kuchar . |
| 4,823,493 | 4/1989 | Gray ............................ 43/15 |
| 4,924,617 | 5/1990 | Parent . |
| 5,010,678 | 4/1991 | Peck et al. . |
| 5,050,333 | 9/1991 | Debreczeni . |
| 5,056,255 | 10/1991 | Campbell ..................... 43/19.2 |
| 5,097,618 | 3/1992 | Stoffel . |
| 5,152,093 | 10/1992 | Bartys . |
| 5,231,784 | 8/1993 | Condusta ..................... 43/19.2 |
| 5,269,088 | 12/1993 | Slaback, Jr. et al. . |
| 5,274,944 | 1/1994 | Laessig . |
| 5,359,802 | 11/1994 | Gutierrez ..................... 43/16 |

FOREIGN PATENT DOCUMENTS

| | | |
|---|---|---|
| 0531992 | 10/1956 | Canada . |
| 0624542 | 9/1961 | Italy . |
| 1333276A | 8/1987 | U.S.S.R. . |
| 1025415 | 4/1966 | United Kingdom . |

*Primary Examiner*—Joseph J. Hail, III
*Assistant Examiner*—Darren Ark
*Attorney, Agent, or Firm*—Price, Heneveld, Cooper, DeWitt & Litton

[57] ABSTRACT

A fishing jig is disclosed for holding a fishing rod and moving the rod in an up and down motion in an oscillating manner. The rod is oscillated by an electric motor that drives a jigging wheel and lever arrangement via a gear assembly which is connected to the jigging wheel. Both the rate of oscillation and oscillation stroke may be varied. Upon a strike by a fish, the jig has a mechanism for quickly raising the rod in an upward direction with sufficient force to set the hook. The distance that the rod travels to set the hook also may be adjusted. In addition, the sensitivity of the jig can be adjusted with regard to both the amount of force that must be exerted upon the fishing rod holder as a result of a fish strike and the degree of travel which the rod holder must undergo, as a result of a fish strike to activate the hook set mechanism. The jig may also be coupled to an alarm that indicates activation of the hook set mechanism.

6 Claims, 7 Drawing Sheets

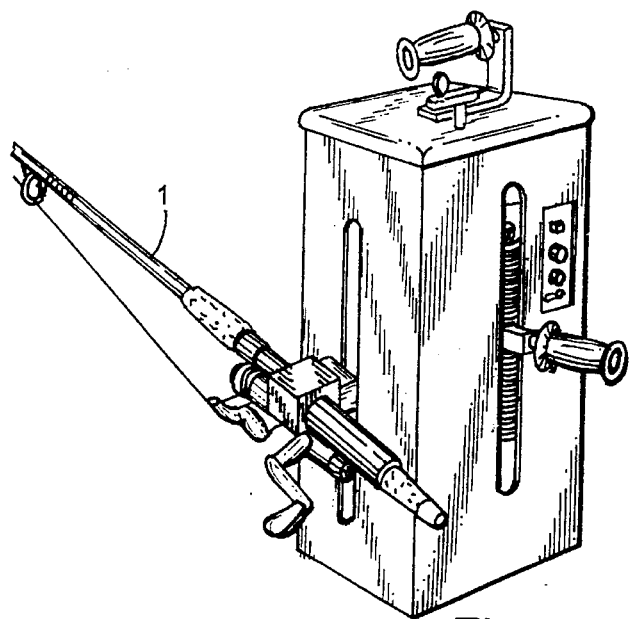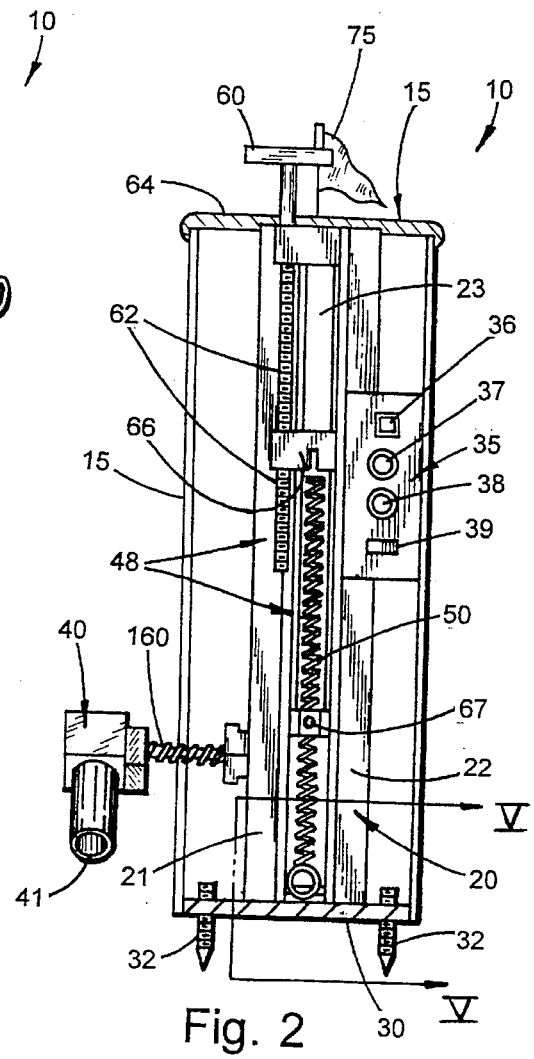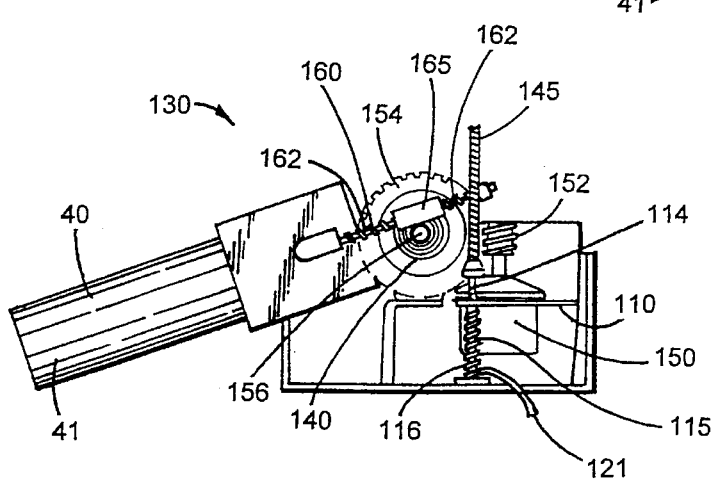

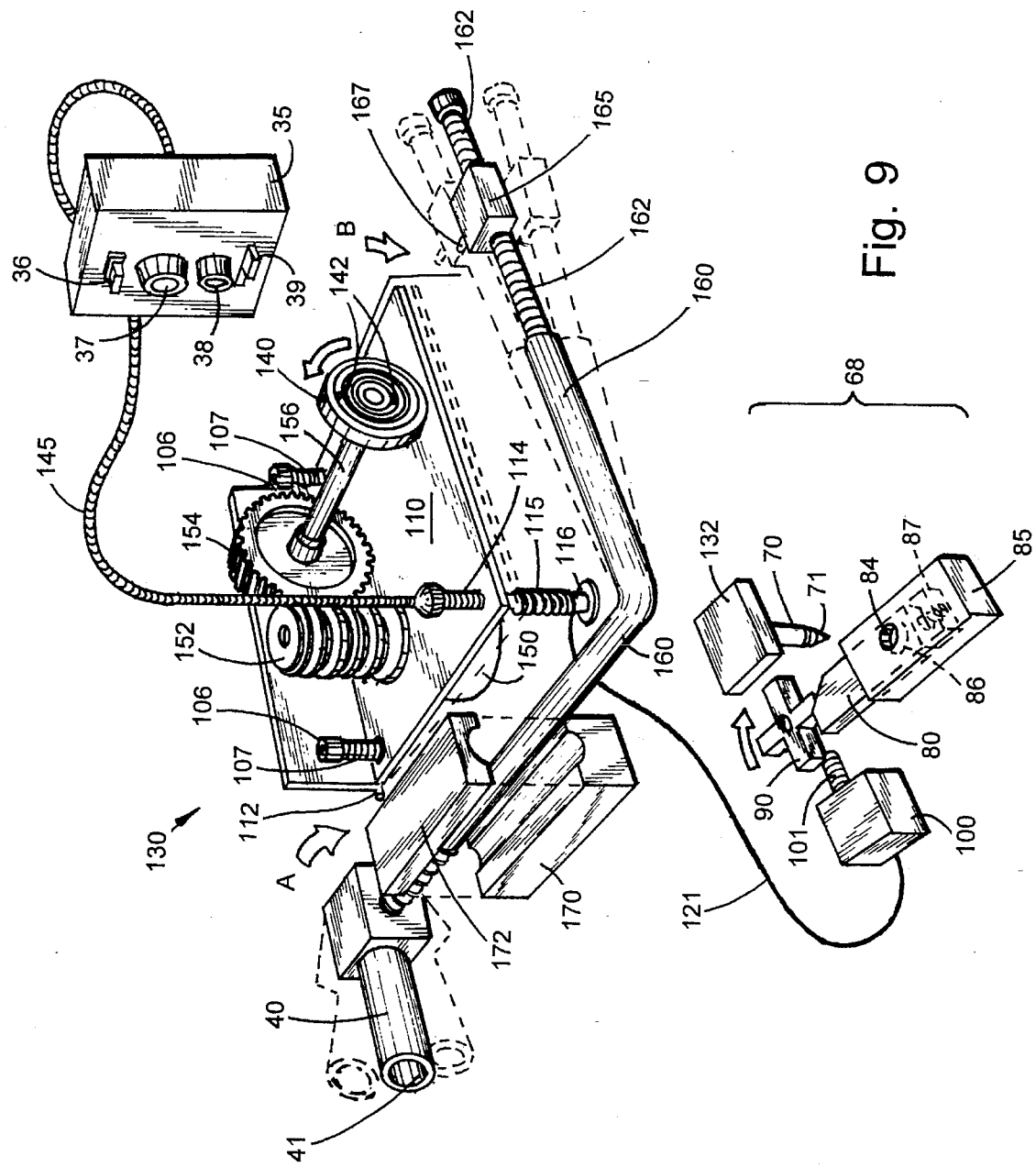

FISHING ROD JIGGER AND AUTOMATIC HOOK SETTING DEVICE

FIELD OF THE INVENTION

The present invention relates to fishing devices and more particularly, to devices for holding a fishing rod while imparting a jigging motion to a fishing lure or bait connected to the rod and to devices that automatically move a fishing rod when a fish bites the lure or bait to set the hook into the fish.

BACKGROUND OF THE INVENTION

Numerous fishing devices are known in the art for imparting a jigging motion to a fishing line such as that described in U.S. Pat. No. 3,550,302. Such device moves the fishing line itself, generally upward and downwardly, by means of an electric motor while the fishing rod is held stationary. U.S. Pat. No. 3,568,352 describes a device that imparts movement to both the fishing line itself and to the rod by a collection of oscillating levers. U.S. Pat. No. 4,642,930 is directed to a device that automatically bobs the bait or fishing lure that is attached to a generally horizontal arm by means of balanced counterweights. U.S. Pat. No. 4,373,287 describes a device which effects a jigging movement to a fishing line attached to a rocker arm by action of a wind vane.

Although satisfactory in some respects, none of the devices described by the '930 or '287 patents is suitable for use with a conventional fishing rod and reel. The device described in the '302 patent, although useable with a fishing rod, does not move the fishing rod itself, but instead relies upon a reciprocating lever arm that extends over the immersed fishing lure or bait. Moreover, the device described in the '302 patent does not allow rapid removal of the fishing rod and line from the device in the event a fish is caught, due to a looped retaining member through which the fishing line passes. The device described in the '352 patent is undesirable due to a complicated setup procedure involving attaching the fishing line to a spring on the end of a lever arm, and positioning the fishing rod between various stationary and movable members. In addition, in such a complicated apparatus as that described in the '352 patent, it is likely that once a fish strike did occur, problems might occur in the line not being released by the device, or the fishing rod not being readily removable from the device. Thus, there is a need for a fishing jig that imparts a jigging motion to the bait or lure, that is easy to use, which does not rely upon components that attach to the fishing line itself, and which allows rapid removal of the fishing rod and line from the device once a fish strike occurs.

When fishing, it is desirable to use different jigging motions depending upon the type of fish that one is attempting to catch. Prior artisans have attempted to provide devices which enable the rate and stroke of jigging oscillation to be varied, such as in the previously noted '352 patent which describes alternative arrangements of the fishing line on the device for varying oscillation rate and stroke. Oscillation rate control is also described in the previously noted '302 patent. United Kingdom Patent No. 1,025,415, directed to an automatic fishing machine, describes a mechanism that imparts movement to a fishing line by means of a powered pulley. As previously noted, it is undesirable to utilize components that directly contact or engage the fishing line, such as a moving pulley because of the need to quickly remove the rod and line in the event of a fish strike. Moreover, none of the aforementioned devices enables variation of both the rate and stroke of oscillation of the rod, without cumbersome attachments to the fishing line. Thus, there is a need for a fishing jig which holds a fishing rod in a simple, uncomplicated manner enabling quick release of the rod and line, but which has provisions enabling variation of both the rate and stroke of oscillation of the rod without attachments to the fishing line.

Prior artisans have also attempted to provide devices which sense a strike by a fish and set the hook upon such sensing. U.S. Pat. No. 4,627,186 describes an automatic fishing machine that upon sensing a strike by a fish, utilizes a spring activated mechanism to quickly raise a fishing rod in an upward direction to set the hook. In addition, U.S. Pat. No. 4,197,668 discloses a fishing rod holder which swings or rotates from one position to another by action of a spring upon a strike by a fish. The previously noted '186 patent also describes a mechanism to vary the distance and thus force that the activation spring exerts on the rod upon a strike by a fish. However, no device has been provided which concurrently allows jigging of the fishing rod, variation in the jigging rate and stroke, while including the capability of sensing a strike by a fish and setting the hook while also allowing the hook setting force to be varied and adjusted. Thus, there is a need for a fishing jig which provides the combination of these features.

Fishing devices are also known in the art for varying the activation sensitivity of the hook setting mechanism, such as in the previously noted '668 patent. The '668 patent describes means for adjusting the sensitivity by use of a coil spring having one of its ends attached to an adjustable threaded member. This adjustment mechanism described by the '668 patent is primarily mechanical and involves a relatively complex apparatus. Accordingly, it is subject to failure, particularly when exposed to outdoor conditions as likely encountered when fishing. Thus there is a need for a relatively simple means for varying or adjusting the sensitivity of a hook set mechanism. In particular, there is a need for a fishing jig that provides this feature in combination with the previously noted features of jigging of the fishing rod, variation in the jigging rate and stroke, and inclusion of sensing a strike by a fish and setting the hook.

SUMMARY OF THE INVENTION

The present invention provides a fishing jig comprising a frame, a slidably movable jigging mechanism, a rod holder engaged with the jigging mechanism, a vertically adjustable retaining member disposed along the frame, a spring extending between the retaining member and either the rod holder or jigging mechanism, and a trip mechanism that releasably engages the slidably movable jigging mechanism such that upon a fish strike, a jigging mechanism is slidably moved along the frame by the spring to set the hook. The jig may further comprise particular jigging mechanisms, particular latch mechanisms, and trip sensing mechanisms for activating the jig.

The present invention also provides a fishing jig comprising a frame, a jigging mechanism comprising a jigging motor, a jigging wheel coupled to the output of the motor, and a movable jigging arm. The jig further comprises a rod holder coupled to one end of the jigging arm such that upon activation of the jigging motor, the arm is moved to thereby effect movement of the rod holder.

The present invention further provides a fishing jig comprising a frame, a retaining member secured at an upper region of the frame, a slidably movable rod holder that can be moved along the frame, a spring extending between the rod holder and the retaining member, and a trip mechanism that retains the rod holder in a first set position, and releases the rod holder to a second released position upon detection of a fish strike by a sensor mechanism.

Moreover, the present invention provides a fishing jig comprising a frame, a rod holder affixed to the frame, a hook set mechanism, and a jigging mechanism, wherein the rod holder is coupled to the jigging mechanism such that the rod holder is oscillated upon activation of the device.

The present invention also provides a fishing jig comprising a frame, a slidably movable rod holder that can slide along the frame, a spring extending between the frame and rod holder, and a latch mechanism which releasably retains the rod holder, and a sensor mechanism that detects when a fish strike occurs.

The present invention also provides related methods of use including a method for setting a fish hook by use of the fishing jig, and a method for imparting a jigging motion to a fishing rod by use of the fishing jig.

BRIEF DESCRIPTION OF THE DRAWINGS

FIG. 1 is a perspective view of a preferred embodiment fishing jig of the present invention in use;

FIG. 2 is a front elevational, cut-away view revealing the interior of the preferred embodiment fishing jig;

FIG. 8 is a partial side elevational view illustrating the jigging mechanism of the preferred embodiment fishing jig;

FIG. 9 is an exploded, perspective view of the trip mechanism and jigging mechanism of the preferred embodiment fishing jig;

DETAILED DESCRIPTION OF THE PREFERRED EMBODIMENTS

FIG. 1 illustrates a preferred embodiment of a fishing jig 10 in use with a fishing rod 1. As illustrated in FIG. 1, once the device is set and retaining a fishing rod, jig 10 allows a hands-free operation until a fish or other game has been caught and it is necessary to reel the fish in. As described in greater detail below, the jig 10 can be operated to impart an oscillating or jigging action to the fishing rod 1 and provide an alarm to notify when a strike has occurred, the jig tripped, and the fishing rod raised rapidly upward to set the hook.

Figure 3:
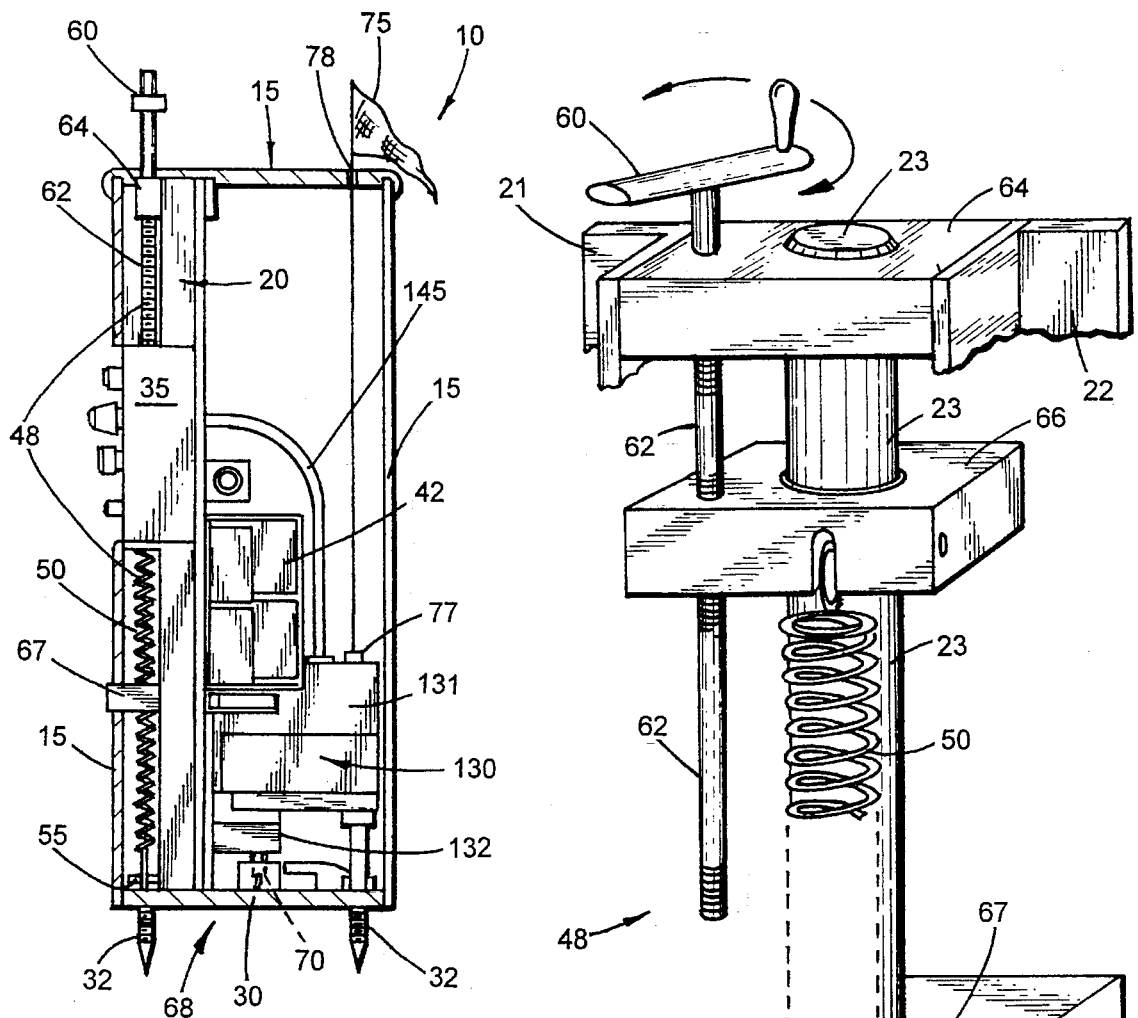
FIG. 3 is a side elevational, cut-away view revealing the interior of the preferred embodiment fishing jig.

Referring to FIGS. 2 and 3, the preferred embodiment fishing jig 10 of the present invention comprises a generally vertical frame assembly 20 having (i) a lower base 30 with one or more mounting members 32 and (ii) one or more generally vertical support members 21 and 22 extending from base 30, a hook set mechanism 48 that sets a fishing hook, a movable jigging mechanism 130 that provides movement to a fishing rod, a rod holder 40 coupled to mechanism 130, a trip mechanism 68 that activates the hook set mechanism 48 upon a strike by a fish, a control panel 35, and an optional weatherproof case 15 that encloses device 10.

Figure 4:
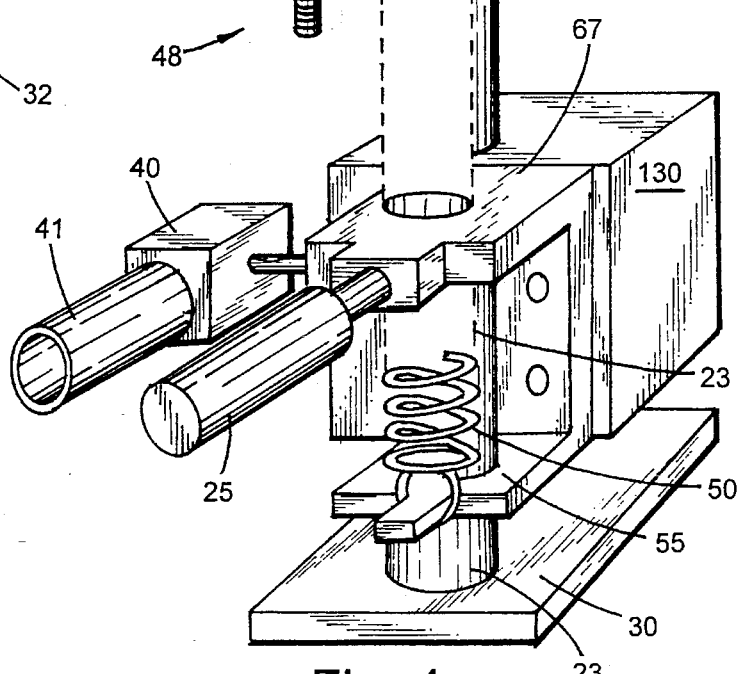
FIG. 4 is a perspective view of the preferred mechanism for providing vertical movement of various components of the preferred embodiment jig.
Figure 5:
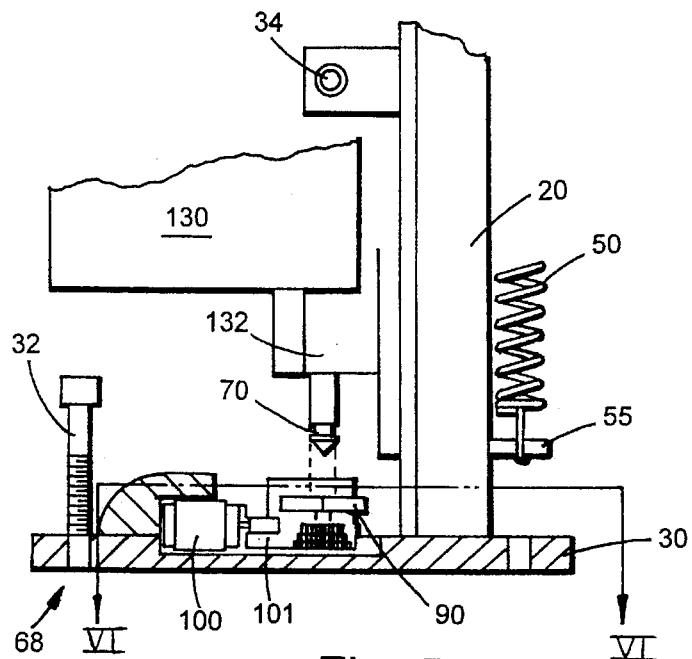
FIG. 5 is a partial cross-sectional view taken along line V—V of FIG. 2, of the lower side of the preferred embodiment fishing jig, illustrating the trip mechanism.
Figure 6:
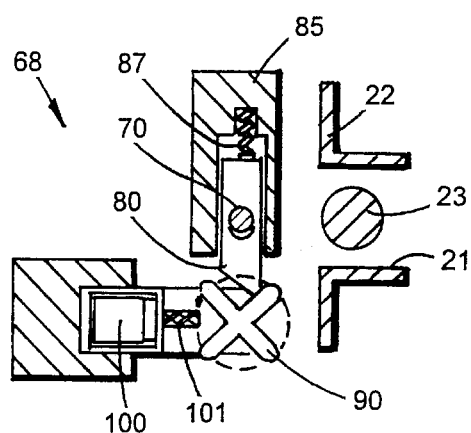
FIG. 6 is a cross section taken along line VI—VI depicted in FIG. 5, further illustrating the trip mechanism of the preferred embodiment fishing jig.
Figure 7:
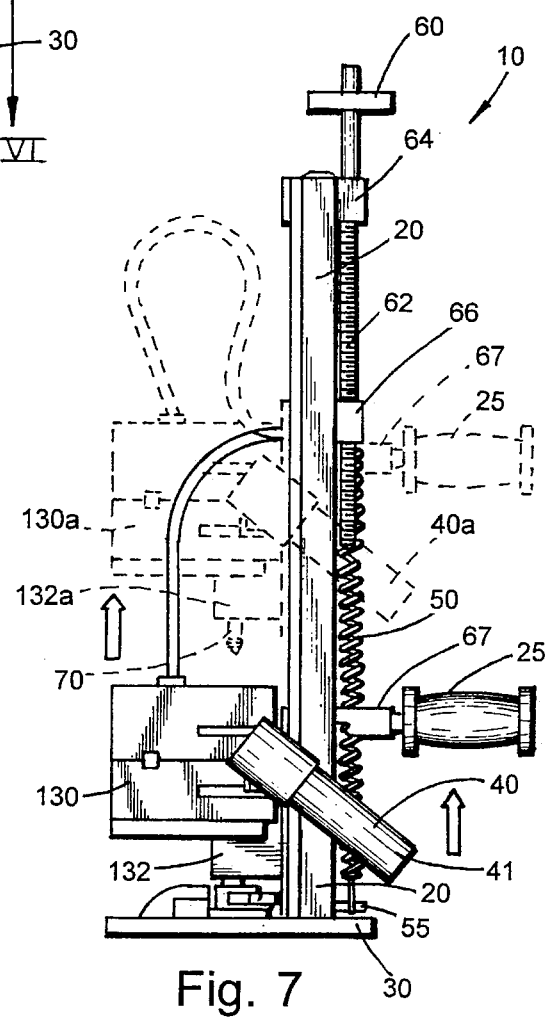
FIG. 7 is a side elevational view of the fishing jig embodiment of FIGS. 1 and 2, illustrating the set position and the release position of the device.
Figure 14:
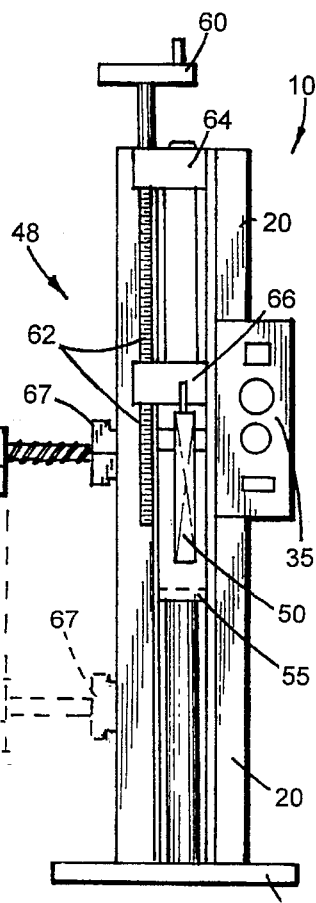
FIG. 14 is a front view further illustrating the set position and the release position of the preferred embodiment fishing jig.

Frame 20 includes provisions to enable jigging mechanism 130 to move generally up and down along the vertical dimension of fishing jig 10, and preferably alongside vertical support members 21 and 22. As illustrated in FIGS. 2, 4, and 6, it is most preferred to provide a cylindrical rod 23 having a low friction outer surface, disposed between vertical support members 21 and 22. Rod 23, secured and affixed to base 30, extends upward to upper retaining member 64. Member 64 is affixed to support members 21 and 22 and may be permanently affixed to rod 23 thereby securing the upper end of rod 23 to frame 20. One or more slidable members, such as lower spring retaining member 55, lower adjustably positionable member 66, and handle member 67, all depicted in FIG. 4, are provided that can be moved up and down over the length of rod 23. Lower spring retaining member 55 and handle member 67 can be in the form of a single component as depicted in FIG. 4, or can be individual members, slidable along rod 23 independent of each other. Movable jigging mechanism 130 is affixed to the slidable members 55 and 67 so that jigging mechanism 130 may be moved vertically along the height of frame 20 as shown in FIGS. 7 and 14 and described in greater detail below. A slidable track assembly could also be utilized instead of a rod and sliding member configuration.

Mounting members 32 of frame 20 enable jig 10 to be affixed or otherwise secured to a mounting surface, such as a layer of ice, a mounting platform on a boat or on land, or other mounting surface. Mounting members 32 are preferably threaded fasteners having sharp, pointed ends for engaging an ice surface, but may also be in the form of adjustable C-clamps, cloth or metal straps, or other mounting components known in the art.

The preferred materials of construction for frame 20 and its primary components, base 30, mounting members 32, support members 21 and 22, and rod 23 are aluminum, aluminum alloys, or other lightweight, corrosion and weather resistant metals. It is contemplated that a wide array of other metals could also be used, such as various grades of steel, provided the finished components are suitably painted or otherwise protected against adverse outdoor conditions likely encountered when using jig 10. Moreover, it is also envisioned that numerous non-metallic materials could be utilized for forming all or part of frame 20 such as, but not limited to, plastics, woods, and combinations thereof.

As best illustrated in FIGS. 2–4 and 12–14, hook set mechanism 48 comprises an upper retaining member 64 secured to rod 23, a lower adjustably positionable member 66, a lower spring retaining member 55 engaged or coupled to movable jigging mechanism 130, a hook set spring 50 extending between member 55 and adjustable member 66, a threaded screw 62, and a hook set adjusting crank 60 for adjusting the vertical position of member 66. Mechanism 48 is "set" by moving rod holder 40, and thus jigging mechanism 130 as described in greater detail below, downward by use of handle 25 to its lowermost position proximate to base 30, thereby placing spring 50 under tension. Mechanism 48 is held in its set position by a latch assembly of a trip mechanism 68 described in greater detail below.

Figure 12:
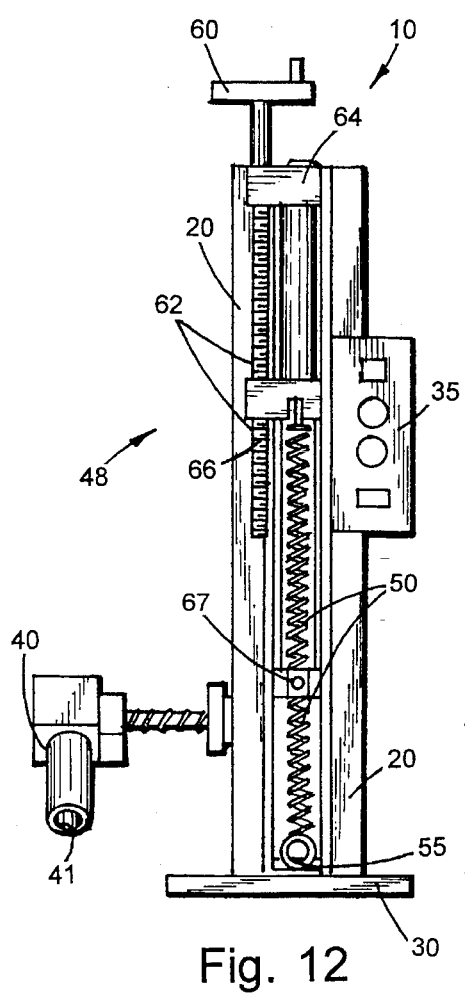
FIG. 12 illustrates the primary components of the preferred embodiment fishing jig in a set position.
Figure 13:
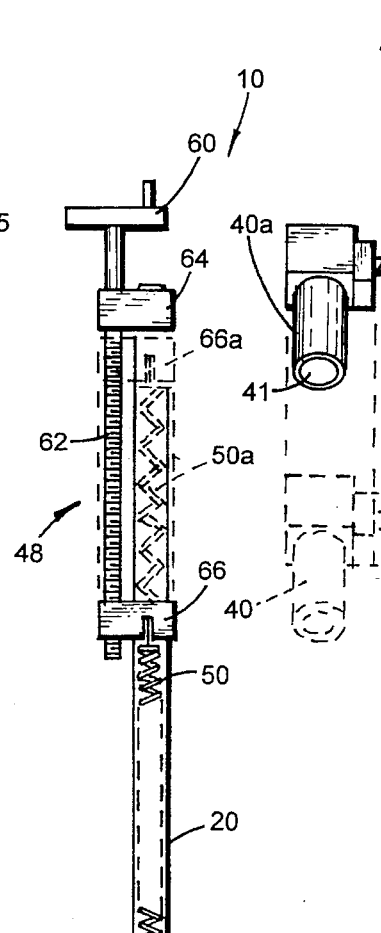
FIG. 13 illustrates the range of adjustment of the set distance of the preferred embodiment fishing jig.

Adjustment of the tension of spring 50, and thus adjustment of the force that the hook set mechanism exerts upon a striking fish when hook set mechanism 48 is activated, is accomplished by adjusting the vertical position of adjustable member 66 along the threaded length of screw 62. The vertical position of member 66 is varied by rotating hook set adjusting crank 60 and screw 62. By adjusting the tension under which spring 50 is placed, the hook set force may be varied. FIG. 13 illustrates the range of distances to which the hook set mechanism may be adjusted and thus the various configurations in which spring 50 may be placed. The smallest hook set force is obtained by adjusting crank 60 until lower adjusting member 66 is in its lowermost position as depicted in FIG. 13. The greatest hook set force is obtained by adjusting crank 60 until member 66 is in its uppermost position depicted in FIG. 13 as 66a whereby spring 50 is fully extended as illustrated by 50a. FIG. 12 illustrates the jig 10 in a set position wherein spring 50 is under moderate tension. FIG. 14 further illustrates the relative positions of rod holder 40, a released position 40a where the rod holder has been raised to an uppermost position and spring 50 is relaxed, and a set position indicated by dashed lines where the rod holder has not yet been raised, and spring 50 is still in a tensioned state.

Jigging mechanism 130 of the present invention may be either stationary and affixed to the frame of jig 10, or as previously described, may be slidably positionable along the vertical dimension of the jig, such as along rod 23 by means of slidable members 67 and 55 illustrated in FIG. 4. The preferred jigging mechanism of the present invention comprises a pivot arm, motor, and drive assembly as follows. A motor providing a rotating output is coupled to a drive assembly, which in turn engages a pivot arm. The pivot arm is coupled to rod holder 40. Upon activation of the motor, the pivot arm is moved in an oscillating or reciprocating fashion to provide a jigging motion at rod holder 40. In a most preferred embodiment, the jigging mechanism of the present invention comprises (i) a jigging motor which provides a rotating powered output, (ii) a jigging wheel that is coupled or otherwise engaged with the rotating output, and (iii) a movable jigging arm having a first end that is selectively engagable with the jigging wheel such as at a location along a face of the wheel, and further having a second end to which is affixed a rod holder. This configuration is such that upon activation of the jigging motor, the jigging wheel is rotated thereby effecting a reciprocating movement of the jigging arm. The jigging arm is angled and retained at a point such that the reciprocating movement at one end of the arm is translated to an arcuate, reciprocating motion at the other end of the arm where a fishing rod holder is attached or otherwise coupled thereto.

The preferred jigging mechanism 130 is best illustrated in FIGS. 8 and 9. Jigging mechanism 130 comprises a jigging motor 150 coupled to a worm gear 152 which engages a drive gear 154. Drive gear 154 engages a jigging drive shaft 156 which engages a jigging wheel 140. Disposed proximate to jigging wheel 140 is movable, L-shaped, jigging arm 160. Jigging arm 160 is selectively engagable with jigging wheel 140 by means of an adjustably positionable jigging block 165 secured to and movable along one end of arm 160. This is preferably accomplished by providing retaining springs 162 on arm 160 and disposed on each side of block 165 for engagement therewith. Jigging block 165 includes a projecting, cylindrical jigging pin 167 which may be engaged with any one of several adjustment apertures 142 formed in a side or face of jigging wheel 140. Each aperture 142 serves as a rotatable bearing surface for pin 167. Upon insertion and engagement of pin 167 in an aperture 142, rotary motion of jigging wheel 140 imparts a reciprocating motion to the end of jigging arm 160 proximate to block 165. Such reciprocating motion on that end of arm 160 imparts a similar reciprocating motion to rod holder 40 affixed to the other end of L-shaped jigging arm 160 as shown by the phantom lines in FIG. 9, that end being rotatably secured between upper and lower jigging retainers 172 and 170 which provide bearing surfaces for arm 160.

The oscillation stroke of jigging arm 160 and rod holder 40 may be adjusted by changing the aperture 142 in which jigging pin 167 is engaged. Each aperture 142 is preferably disposed at a different radial position on the side of jigging wheel 140. Depending upon the variability desired for the oscillation of rod holder 40, the number of apertures provided in wheel 140 may range from one up to ten or more. Block 165 is slidably positionable along arm 160 to facilitate positioning pin 167 in a different aperture 142 in wheel 140. Retaining springs 162 keep block 165 located in a predetermined default location with respect to wheel 140. The oscillation stroke or arc of rod holder 40 is adjusted to various positions by disengaging the pin 167 of block 165 from one aperture 142 in jigging wheel 140, and re-inserting pin 167 into another, desired aperture 142 at another radial position at the desired distance from the axis of rotation of drive shaft 156 according to fishing conditions and fish size. Jigging mechanism 130 may be set to provide a relatively large oscillation stroke at rod holder 40 by engaging pin 167 in the radially outermost adjustment aperture 142. A relatively small oscillation stroke may be provided by inserting jigging pin 167 in the innermost adjustment aperture 142.

The rate of oscillation of jigging arm 160 and rod holder 40 is primarily varied by adjusting the output speed of jigging motor 150. Such adjustment may be made by varying a jigging speed control 38 on control panel 35. Jigging speed control 38 may utilize a wide variety of electrical controls, such as a control circuit with a variable rheostat known to those skilled in the art. It is also recognized that the rate of oscillation of jigging arm 160 and rod holder 40 is also affected by the radial position of the aperture 142 within which pin 167 of jigging arm 160 is engaged. Thus, it is contemplated that jigging speed control 38 may also be adjusted by or correlated with selection of aperture 142 within which pin 167 is engaged.

The materials of construction for components comprising jigging mechanism 130 include metals commonly utilized for forming gears and other drive members. It is reasonable that certain plastics could also be utilized for some or all drive components of jigging mechanism 130. It is preferred that a cover 131, as illustrated in FIG. 3, be provided which provides protection for jigging mechanism 130 components.

Fishing jig 10 further comprises rod holder 40 for holding a fishing rod and transmitting movement from jigging mechanism 130 to the fishing rod. Holder 40 includes a cylindrical or other shaped tube 41 forming a socket for receiving the handle of a fishing rod. Jigging motion is transmitted from mechanism 130 to rod holder 40 by jigging arm 160 extending between and coupling rod holder 40 and mechanism 130. A fishing rod is retained in jig 10 by inserting the rod, typically its handle, into the cylindrical socket 41 of rod holder 40. The interior surface of socket 41 that contacts the fishing rod, or handle thereof, may utilize a high friction material to contact the rod, and assist in retaining the rod within socket 41. Rod holder 40 and/or socket 41 may take a variety of forms other than that depicted in the accompanying drawings. Rod holder 40 and/or socket 41 may for instance, be formed from a wire mesh that allows moisture or water contained by rod holder 40 to readily evaporate therefrom. Rod holder 40 and socket 41 are preferably formed from a lightweight, weather resistant, metal such as aluminum.

The trip mechanism of the present invention allows retention of the rod holder 40 and jigging assembly 130 when these components are placed in their "set" position, that is, moved downward against the hook set spring 50, thereby placing that spring under tension. The trip mechanism utilizes a trip sensing mechanism to detect when a strike is occurring on the fishing lure or bait, which generally is detected by occurrence of a sufficiently large strike force exerted downward on the rod holder. The trip mechanism further has provisions to release the rod holder and jigging assembly when a strike is detected, whereby the rod holder is released to the tensioned hook set spring, causing the rod holder to be pulled rapidly upward, thereby setting the hook.

Figure 10:
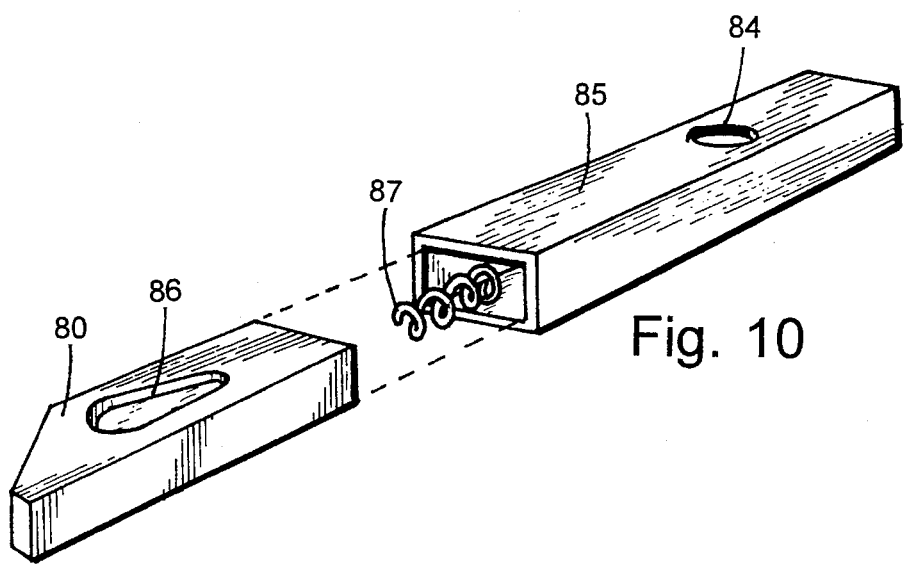
FIG. 10 is an exploded view of a latch assembly utilized in the trip mechanism of the preferred embodiment fishing jig.
Figure 11:
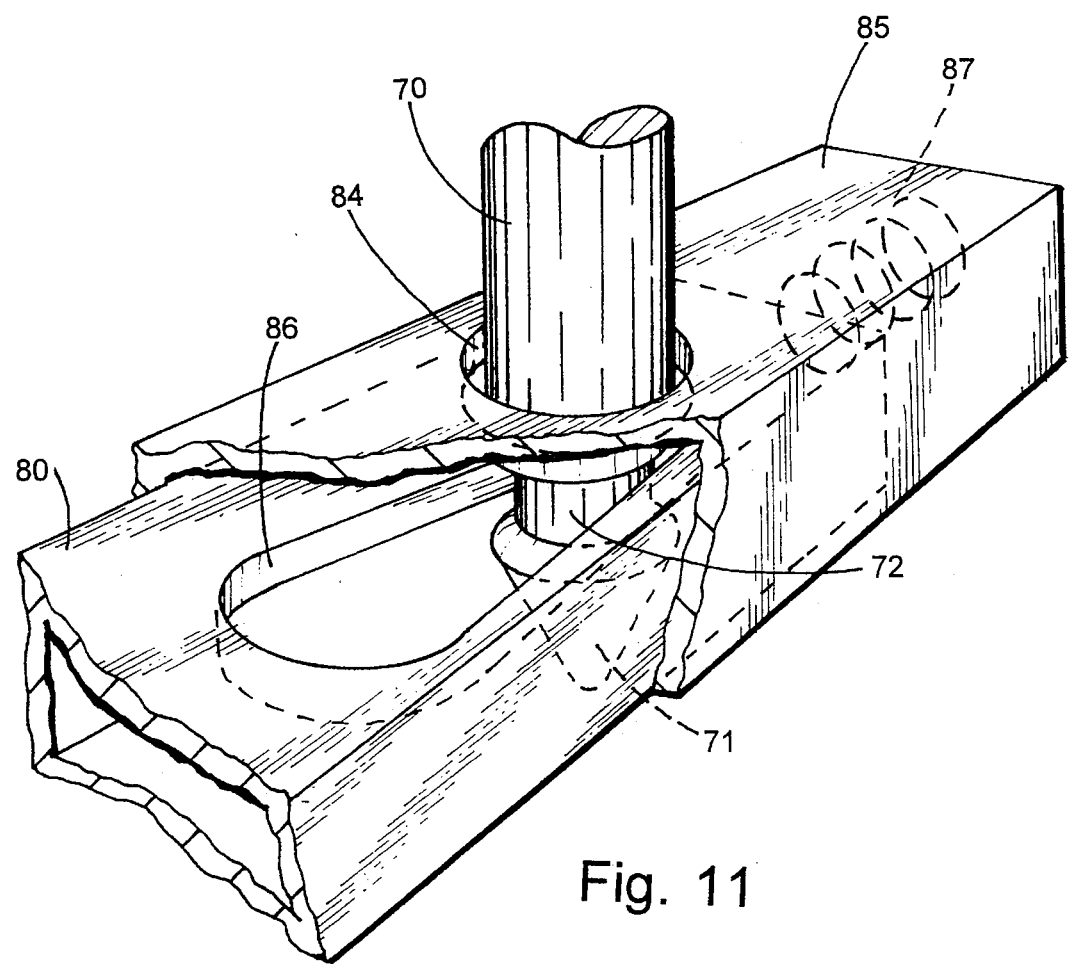
FIG. 11 is a detailed perspective view of the latch assembly of FIG. 10, illustrating engagement between a plunger and a pin for releasably retaining the device when set.

The preferred trip mechanism 68 is best illustrated in FIGS. 5, 6, 9–11, and 15–16. Referring to FIG. 9, the trip mechanism is activated by movement of a trip plate 110, explained in greater detail below, that completes an electrical circuit which activates a strike motor 100. Operation of motor 100 drives a wheel and plunger combination that releases a pin 70 resulting in activation of the previously described hook set mechanism 48, which mechanism then pulls rod holder 40 rapidly upward to set the hook. The trip mechanism 68 comprises strike motor 100 having an output shaft 101. Output shaft 101 is coupled to a rotatable star wheel 90 which engages a latch assembly that retains and releases the jig when placed in its set position. Latch assembly comprises a locking pin 70, typically coupled to rod holder 40 and/or jigging mechanism 130, and a movable keeper member 80 having provisions to retain the locking pin when the keeper is placed in a first position, i.e. when the device is "set," and release the locking pin when the keeper is placed in a second position, i.e. when the device is "released." In the most preferred embodiment, keeper 80 is in the form of a slidably movable plunger. Referring to FIGS. 10 and 11, plunger 80 is adapted to slide and fit within a hollow, plunger guide member 85 having an aperture 84 on one of its surfaces. A spring 87 urges plunger 80 outwardly of guide member 85. Plunger 80 has a receiving channel 86 defined on one of its surfaces that receives and retains locking pin 70 when the plunger is moved to a particular position, and that releases locking pin 70 when the plunger is moved to a different position. Plunger 80 further has an interior chamber formed below receiving channel 86 for accommodating tapered head 71 of pin 70. When the tapered head 71 of pin 70 is inserted through aperture 84 of guide member 85 and past receiving channel 86, plunger 80 is forced into guide member 85 against spring 87 until the tapered head 71 of pin 70 passes the walls of channel 86 and enters the interior chamber of plunger 80. Once the tapered head 71 of pin 70 is fully extended into plunger 80 and past walls of channel 86, plunger 80 slides slightly out of guide member 85 due to action of spring 87 until the recessed portion 72 of pin 70 contacts the walls of channel 86 as illustrated in FIG. 11. When the trip mechanism is "set," plunger 80 is disposed within member 85 such that cavity 86 in plunger 80 is generally aligned with aperture 84, through which locking pin 70 is extended to retain jigging mechanism bottom plate 132. When mechanism 68 is "tripped," and motor 100 activated, star wheel 90 rotates thereby causing plunger 80 to slidably travel into or from plunger guide member 85. Linear movement of plunger 80, into guide 85 releases locking pin 70 previously retained through aperture 84 by plunger 80. Release of locking pin 70 activates hook set mechanism 48 and causes release of spring 50 previously placed under tension.

Figure 15:
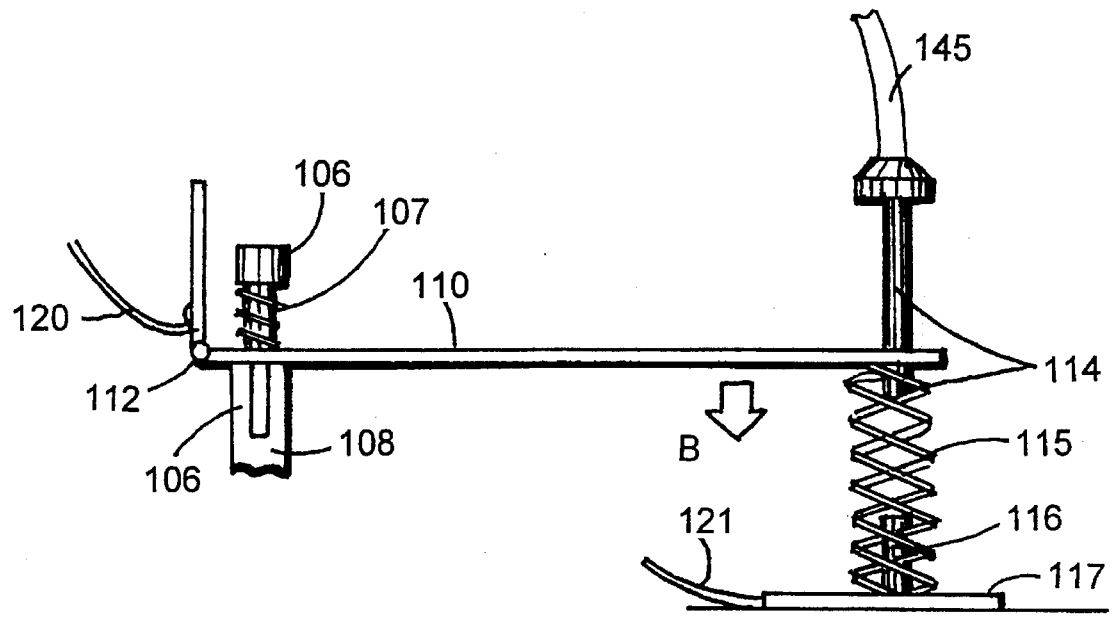
FIG. 15 illustrates a trip sensing mechanism utilized in the preferred embodiment fishing jig.
Figure 16:
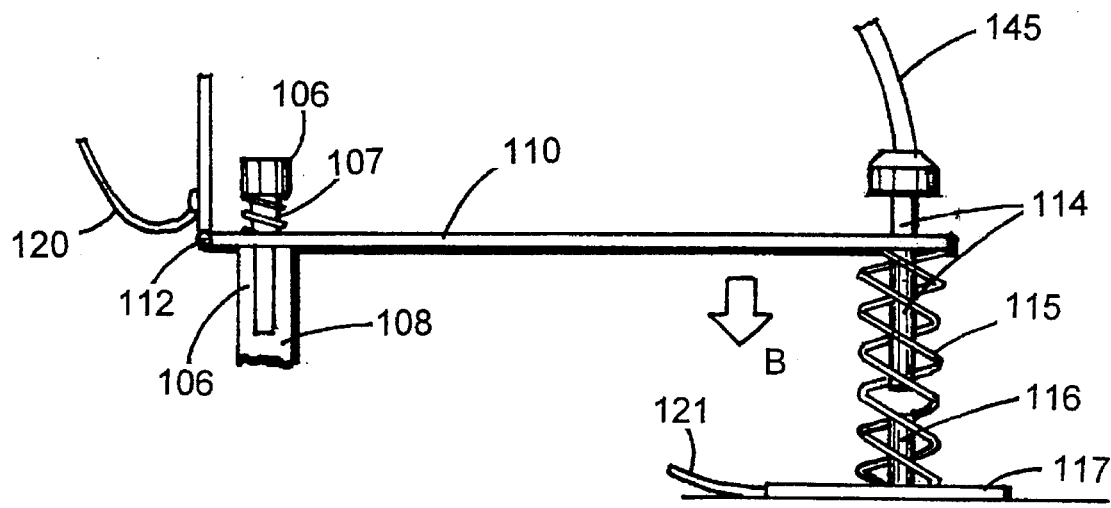
FIG. 16 illustrates the trip sensitivity adjustment of the trip sensing mechanism depicted in FIG. 15.

FIGS. 5, 6, 9, 15 and 16 best illustrate the operation of trip mechanism 68 of fishing jig 10. Once the hook set mechanism 48 is set, and the jigging mechanism 130 is placed in its lowermost position, jigging mechanism 130 and rod holder 40 are held in this position against spring 50 by locking pin 70, locking plunger 80, and star wheel 90 of trip mechanism 68. Star wheel 90 remains stationary as long as strike motor 100 is not activated. Motor 100 is activated by a trip sensing mechanism described in greater detail below, that detects when a strike occurs on a fishing lure of a rod disposed in rod holder 40. Referring to FIG. 9, once there is a downward pull on rod holder 40, i.e., when a fish strikes the bait or lure, arm 160 is rotated in the direction indicated by arrow A, thereby causing trip plate 110 to rotate about pivot pins 112 against spring 115 in the direction of arrow B to the position indicated by the dashed lines. This movement is transmitted from rod holder 40, through arm 160, wheel 140, shaft 156, and gears 154 and 152, to plate 110. Once trip plate 110 is moved a sufficient distance downward against spring 115, upper trip contact 114 is placed into electrical contact with lower trip contact 116, thereby completing an electrical circuit with strike motor 100. Spring 115 is around contacts 114 and 116, between trip plate 110 and support plate 117 (FIGS. 15 and 16). As previously described, once strike motor 100 is activated, star wheel 90 rotates thus depressing plunger 80 causing release of locking pin 70, which in turn activates the hook set mechanism, thereby releasing spring 50 previously placed under tension. Once released, spring 50 exerts an upward force on jigging mechanism 130, in turn causing rod holder 40 to travel upward and set the hook.

The trip sensing mechanism is adjustable so that the distance that trip plate 110 must travel in the direction of arrow B to activate strike motor 100, can be varied. This provides a strike sensitivity adjustment. Adjustment of the amount of distance between trip plate 110 and contact 116 necessary to activate strike motor 100 is accomplished by rotating strike sensitivity control knob 37 on control panel 35. Strike sensitivity control knob 37 is coupled to a flexible spring 145 or threaded sheath and cable combination known to those skilled in the art, which in turn is coupled to upper trip contact 114. Upper trip contact 114 has a threaded lower portion which screws into a threaded receiving channel provided in plate 110. Rotation of control knob 37 rotates spring 145 or threaded sheathed cable thereby rotating upper trip contact 114 and causing extension or retraction of upper trip contact 114 relative to the underside of plate 110. The closer upper trip contact 114 is brought to contact 116, the less angular travel is required at rod holder 40 in the direction of arrow A to move plate 110 in the direction of arrow B and thus bring contact 114 into electrical association with contact 116. Accordingly, the further upper trip contact 114 is brought away from contact 116, the greater angular travel at rod holder 40 is required to move plate 110 into electrical association with contact 116.

FIGS. 15 and 16 illustrate the preferred trip sensing mechanism. As previously explained, upon a strike by a fish, rod holder 40 is rotated causing trip plate 110 to move in the direction of arrow B. When the rod holder undergoes a preselected amount of travel, resulting from a fish strike, such that plate 110 is urged downward a sufficient distance and contact 114 is placed into electrical contact with contact 116, strike motor 100 is activated through motor power or control leads 120 and 121. The distance that plate 110 must travel to place contacts 114 and 116 in contact with one another, can be adjusted by varying the vertical position of contact 114 with respect to plate 110. When the jig is utilized in fishing applications in which it is desirable to activate the trip mechanism upon only a slight tug or strike, contact 114 is adjusted downward to a relatively close position with respect to contact 116 as illustrated in FIG. 16.

Another adjustment that may be made with respect to the sensitivity of the trip mechanism, i.e. strike sensitivity adjustment, relates to the degree of force imparted to rod holder 40 necessary to activate the trip mechanism. In contrast to the previously described mechanism utilizing vertically positionable contact 114 which allows for adjustment of the amplitude or distance which rod holder 40 must travel to activate the trip mechanism, another aspect of the trip sensing mechanism provides for adjusting the degree of force that must be imparted to the rod holder to activate the trip mechanism.

Referring to FIGS. 9, 15, and 16, plate 110 is cantilevered from its mounting location at seat 108 and members 106. Members 106 preferably freely pass through apertures formed in plate 110 and engage mounting seat 108. Disposed between the head of each member 106 and the upper surface of plate 110 is a spring 107 that exerts a downward force such that plate 110 is urged and maintained against seat 108. By varying the vertical position of the head of member 106 with respect to plate 110, the amount of force exerted against plate 110 by spring 107 can be varied. If member 106 is positioned relatively far from the upper surface of plate 110, spring 107 will be minimally compressed, and so, plate 110 can be easily moved about the fulcrum point at mounting seat 108 in the direction of arrow B at its free end near contacts 114 and 116. In this setting, a relatively minor force at rod holder 40 transmitted to plate 110 and in the direction of arrow B, will move plate 110 such that contacts 114 and 116 are brought together. Alternatively, if member 106 is adjusted so that the head of member 106 is relatively close to the upper surface of plate 110, and so spring 107 is tightly compressed, a greater amount of force at rod holder 40 will be necessary to move plate 110 in the direction of arrow B such that contacts 114 and 116 are brought together.

Thus, the preferred trip sensing mechanism enables the user to tailor the strike conditions that will release the device and cause activation of the hook set mechanism. By adjusting both the degree of force and the amplitude of the strike necessary to activate the hook set mechanism, an exceedingly wide range of fishing conditions may be accounted for.

Strike motor 100 and jigging motor 150 preferably are 12 volt electric motors. It is also preferred that jigging motor 150 be a variable speed motor, adjustable by jigging speed control 38. Jig 10 further includes a power pack 42, as depicted in FIG. 3, for powering motors 100 and 150, and other electrical components. Power pack 42 is preferably a rechargeable battery or collection of batteries that have sufficient power output and storage capacity to provide at least several hours of continuous operation of jigging motor 150 and occasional operation of strike motor 100. Four D-cells have been found to provide sufficient power for typical uses. It is envisioned that power pack 42 may be in the form of replaceable chargeable battery packs as are common in the powered hand tool industry. For applications in which jig 10 will be operated in relatively cold temperatures, e.g. 20° F. or less, it is preferred to provide a storage space around power pack 42 large enough to accommodate a heat generating thermal pack. Such thermal packs generate heat chemically, typically upon mixing two or more reagents together in a sealed pouch. A master power switch connected between power pack 42 and motors 100, 150 may be provided such as switch 34 illustrated in FIG. 5.

Jig 10 also has provisions for signalling when a strike has occurred on the fishing lure or bait. This is preferably provided by activating an alarm upon activation of trip mechanism 68 and/or release of hook set mechanism 48. Such alarm may be configured to be activated upon release of locking pin 70 from plunger 80. Alternatively or in addition, such alarm may be configured to be activated upon release or upward movement of spring 50 whereby a switch is closed when jigging mechanism 130 slides upward along rod 23 when the device is tripped. Alarm indication can be provided by an audible horn or siren, or a flashing or colored light. Such devices can be powered by power pack 42. Enablement of the alarm circuit may be provided by a strike alarm on/off switch 39 in control panel 35. In addition, or alternatively, a flag or other visual indicator may be attached to the device which is raised when the device is tripped. As depicted in FIGS. 2 and 3, a flag 75 having a base 77 mounted to jigging mechanism cover 131 and extending through case opening 78 can be provided. Upon release of jig 10, and upward travel of rod holder 40 and jigging mechanism 130, flag 75 is extended upward through opening 78 to indicate that the device has been triggered.

The operation of the preferred embodiment fishing jig is as follows. The jig is set or activated by placing rod holder 40 in the lowermost or set position as illustrated in FIG. 7 by pushing a set handle 25 on slidable jigging mechanism 130 downward into the lower position against vertically aligned spring 50. A fishing rod can be placed in rod holder either before or after moving the jigging mechanism and rod holder to its set position. Once set, device 10 is ready for operation and the jigging motion can be initiated by activating a jigging on/off switch 36 on panel 35 depicted in FIG. 2. By leaving the switch in the off position, the device can be operated as a tip-up without any jigging function.

Once the unit is activated and the device has started its oscillating motion of rod holder 40, the speed of oscillation, or jigging speed, is controlled by the previously described variable jigging speed control 38 on panel 35. Another adjustment that may be made is the previously described strike sensitivity to adjust both the amplitude and the force of the strike imparted at rod holder 40 to cause release of the jigging mechanism 130 and rod holder 40 to tensioned spring 50. Varying of the amplitude of the strike at rod holder 40 necessary to trigger the device is provided by adjusting the strike sensitivity control knob 37 on control panel 35, which in turn adjusts the vertical position of contact 114 relative to the underside of plate 110. Varying of the force of the strike at rod holder 40 necessary to trigger the device is provided by adjustment of the vertical position of members 106 and thus degree of compression of springs 107. Upon a strike by a fish of sufficient amplitude and force to activate strike motor 100, jigging mechanism 130 and rod holder 40 are released via release of pin 70 from plunger 80. Those components, i.e., jigging mechanism 130 and rod holder 40, travel upward to their respective positions, 130a and 40a, as depicted in FIG. 7.

The preferred embodiment fishing jig 10 automatically imparts motion to a fishing bait or lure, it is easy to use, does not rely upon components which attach to the fishing line itself, and allows for rapid removal of the fishing rod from the jig upon a strike by a fish. Jig 10 also uniquely provides a combination of jigging, variation of the jigging rate and stroke, sensing a strike by a fish, and setting the hook upon such sensing. The force of the setting of the hook may also be varied. Moreover, the present jig further combines a sensitivity adjustment with regard to both the amplitude and force of the fish strike necessary to activate the trip mechanism, in combination with all of the previously described features.

The present invention also provides related methods of use, such as a method of setting a fish hook and a method of imparting a jigging motion to a fishing rod by use of the fishing jig. In a first method for setting a fish hook, the jig 10 is affixed or otherwise attached to a suitable mounting surface such as ice adjacent a fishing hole, preferably via mounting members 32. The rod holder or set handle 25, generally coupled to the jigging mechanism 130 and rod holder 40, is moved downward against the force of the hook set spring 50 until the rod holder is retained by the trip set mechanism, as previously described. A fishing rod is then placed in the rod holder and the fishing hook, bait, or lure immersed or otherwise made accessible for strikes by fish. When a strike of sufficient amplitude and force is exerted upon the hook, and transferred to the rod holder via the fishing rod and fishing line, the rod holder and jigging mechanism are released by the trip set mechanism, as previously described. Once released, the tensioned hook set spring pulls the rod holder and fishing rod disposed therein rapidly upward thereby setting the hook.

In a second method for imparting a jigging motion to a fishing rod, the jig is affixed to a suitable mounting surface as previously described, and a fishing rod is placed in the rod holder. The desired jigging stroke is set by appropriate selection of aperture 142 in jigging wheel in which jigging arm 160 is engaged. The jigging motor is then activated to impart a jigging motion to the rod holder. If desired, jigging speed can be adjusted by varying the speed of the jigging motor output.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the Doctrine of Equivalents.

The embodiments of the invention in which an exclusive property or privilege is claimed are defined as follows.

1. A fishing jig comprising:

a frame including a base with at least one generally vertical member affixed thereto;

a slidably movable jigging mechanism slidably mounted on said at least one vertical member, said jigging mechanism being movable between a first set position and a second released position;

a latch mechanism for holding and releasing said jigging mechanism when in said first set position;

a rod holder engaged with said jigging mechanism;

a vertically adjustable retaining member disposed along said frame at a location near an upper portion of said at least one vertical member;

a hook set spring extending between said retaining member and at least one of said rod holder and said jigging mechanism;

a trip mechanism adapted to actuate said latch mechanism to release said jigging mechanism upon exertion of a fish strike applied to said rod holder, whereby said jigging mechanism is slidably moved from said first set position to said second released position by said hook set spring;

a trip sensing mechanism having a trip plate at said frame, having a free end which is generally movable upon exertion of said fish strike force applied to said rod holder;

an electrically conductive, adjustably positionable upper contact secured to said trip plate; and an electrically conductive, lower contact in position to contact said upper contact upon sufficient movement of said trip plate at said free end, whereby upon electrical contact occurring between said upper contact and said lower contact resulting from movement of said free end of trip plate, said trip mechanism is caused to actuate said latch mechanism to thereby release said jigging mechanism.

2. The fishing jig of claim 1 wherein said trip sensing mechanism further comprises:

an adjustably positionable retaining member extending above a surface of said trip plate; and a spring disposed between a portion of said retaining member and said surface of said trip plate, whereby the degree of movement of said trip plate at said free end is adjusted by varying the position of said retaining member with respect to said surface of said trip plate.

3. A fishing jig comprising:

a frame including a base with at least one generally vertical support member affixed thereto;

a retaining member secured along said frame proximate to an upper region thereof;

a slidably movable rod holder engaged with said vertical support member such that said rod holder is slidably movable along said vertical support member;

a hook set spring extending between said retaining member and said rod holder, wherein said spring urges said rod holder from a set location along said vertical support member toward a release location along said vertical support member; and a trip mechanism comprising (i) a latch member releasably retaining said rod holder at said set location, (ii) a sensor mechanism that detects a force on said rod holder indicative of a fish strike, and (iii) a keeper member to release said latch member and said rod holder responsive to detection of said fish strike by said sensor, whereby said rod holder is pulled upward from said set location by said hook set spring and a hook connected to a fishing rod disposed in said rod holder is set in the fish;

said sensor mechanism comprising a trip plate at said frame, having a free end which is generally movable upon said fish strike on said rod holder;

an electrically conductive, adjustably positionable upper contact that may be positionably moved with respect to said trip plate; and an electrically conductive, lower contact disposed to contact said upper contact upon sufficient movement of said trip plate at said free end, whereby upon electrical contact occurring between said upper contact and said lower contact, said keeper member is caused to release said rod holder.

4. The fishing jig of claim 3 wherein said sensor mechanism further comprises:

an adjustably positionable retaining member extending above a surface of said trip plate; and a spring disposed between a portion of said retaining member and said surface of said trip plate, whereby the degree of movement of said trip plate at said free end is adjusted by varying the position of said retaining member with respect to said surface of said trip plate.

5. A fishing jig comprising:

a frame having a base with at least one generally vertical support member secured thereto;

a slidably movable rod holder engaged with said vertical support member such that said rod holder is slidably movable along said vertical support member;

a hook set spring extending between an upper portion of said vertical support member and said rod holder, wherein said spring urges said rod holder from a set location proximate to a lower portion of said vertical support member, toward a release location proximate to said upper portion of said vertical support member;

a latch mechanism releasably retaining said rod holder at said set location; and a sensor mechanism that upon detection of a strike force exerted upon said rod holder, activates said latch mechanism to release said rod holder to said hook set spring previously placed under tension by moving said rod holder to said set location, said sensor mechanism including: (i) a trip plate at said frame, having a free end which is generally moveable upon exertion of said strike force applied to said rod holder, (ii) an electrically conductive, adjustably positionable upper contact secured to said trip plate, and (iii) an electrically conductive, lower contact in position to contact said upper contact upon sufficient movement of said trip plate at said free end, whereby upon electrical contact occurring between said upper contact and said lower contact resulting from movement of said trip plate, said latch mechanism is activated thereby releasing said rod holder.

6. The fishing jig of claim 5 wherein said sensor mechanism further includes: (iv) an adjustably positionable retaining member securing said trip plate to a mounting seat; and (v) a spring disposed between a portion of said retaining member and said trip plate, whereby the degree of movement of said trip plate about said free end is adjusted by varying the position of said retaining member with respect to said trip plate.

* * * * *